United States Patent
Srivastava

(10) Patent No.: US 10,181,957 B2
(45) Date of Patent: *Jan. 15, 2019

(54) SYSTEMS AND METHODS FOR DETECTING AND/OR HANDLING TARGETED ATTACKS IN THE EMAIL CHANNEL

(71) Applicant: GraphUS, Inc., Reston, VA (US)

(72) Inventor: Manoj Kumar Srivastava, Reston, VA (US)

(73) Assignee: GraphUS, Inc., Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/605,137

(22) Filed: May 25, 2017

(65) Prior Publication Data
US 2017/0324767 A1    Nov. 9, 2017

Related U.S. Application Data

(63) Continuation of application No. 14/709,460, filed on May 11, 2015, now Pat. No. 9,686,308.
(Continued)

(51) Int. Cl.
*G06F 21/00*    (2013.01)
*G06F 15/16*    (2006.01)
(Continued)

(52) U.S. Cl.
CPC ........... *H04L 12/14* (2013.01); *G06Q 10/107* (2013.01); *H04L 12/58* (2013.01); *H04L 12/585* (2013.01);
(Continued)

(58) Field of Classification Search
CPC ....... G06Q 10/107; H04L 51/12; H04L 12/58; H04L 12/585; H04L 63/126; H04L 63/1441
See application file for complete search history.

(56) References Cited

U.S. PATENT DOCUMENTS 8,135,780 B2 * 3/2012 Gillum ................ G06Q 10/107
                                                    709/206
8,209,387 B2 * 6/2012 Fleming, III ........ G06Q 10/107
                                                    709/206
(Continued)

OTHER PUBLICATIONS

Gomes, Luiz H., et al. "Comparative graph theoretical characterization of networks of spam and legitimate email." arXiv preprint physics/0504025 (2005). (Year: 2005).*
(Continued)

*Primary Examiner* — Michael Simitoski
(74) *Attorney, Agent, or Firm* — Nixon & Vanderhye, P.C.

(57) ABSTRACT

Techniques for detecting and/or handling target attacks in an enterprise's email channel are provided. The techniques include receiving aspects of an incoming email message addressed to a first email account holder, selecting a recipient interaction profile and/or a sender profile from a plurality of predetermined profiles stored in a memory based upon the received properties, determining a message trust rating associated with the incoming email message based upon the incoming email message and the selected recipient interaction profile and/or the sender profile; and generating an alert identifying the incoming email message as including a security risk based upon the determined message trust rating. The recipient interaction profile includes information associating the first email account holder and a plurality of email senders from whom email messages have previously been received for the first email account holder, and the sender profile includes information associating a sender of the incoming email message with characteristics determined from a plurality of email messages previously received from the sender.

12 Claims, 7 Drawing Sheets

Related U.S. Application Data

(60) Provisional application No. 62/116,856, filed on Feb. 16, 2015, provisional application No. 61/991,854, filed on May 12, 2014.

(51) Int. Cl.
  *H04L 29/06* (2006.01)
  *H04L 12/14* (2006.01)
  *H04L 12/58* (2006.01)
  *G06Q 10/10* (2012.01)

(52) U.S. Cl.
  CPC ............ *H04L 51/12* (2013.01); *H04L 63/126* (2013.01); *H04L 63/1433* (2013.01)

(56) References Cited

U.S. PATENT DOCUMENTS

| | | | |
|---|---|---|---|
| 8,255,468 B2* | 8/2012 | Vitaldevara | G06Q 10/107 |
| | | | 709/206 |
| 9,154,514 B1* | 10/2015 | Prakash | H04L 63/1483 |
| 2003/0167402 A1 | 9/2003 | Stolfo | |
| 2004/0177120 A1 | 9/2004 | Kirsch | |
| 2005/0015455 A1 | 1/2005 | Liu | |
| 2005/0080857 A1 | 4/2005 | Kirsch | |
| 2006/0004896 A1 | 1/2006 | Nelson | |
| 2006/0031314 A1 | 2/2006 | Brahms | |
| 2006/0059238 A1 | 3/2006 | Slater | |
| 2006/0168024 A1 | 7/2006 | Mehr | |
| 2006/0179113 A1 | 8/2006 | Buckingham | |
| 2006/0277259 A1 | 12/2006 | Murphy | |
| 2007/0086592 A1 | 4/2007 | Ellison | |
| 2008/0133672 A1 | 6/2008 | Gillum | |
| 2008/0141026 A1 | 6/2008 | Cordery | |
| 2008/0250106 A1* | 10/2008 | Rugg | G06Q 10/107 |
| | | | 709/206 |
| 2008/0313704 A1* | 12/2008 | Sivaprasad | H04L 51/12 |
| | | | 726/2 |
| 2010/0100944 A1* | 4/2010 | Fleming, III | G06Q 10/107 |
| | | | 726/4 |
| 2010/0205259 A1* | 8/2010 | Vitaldevara | G06Q 10/107 |
| | | | 709/206 |
| 2012/0226761 A1* | 9/2012 | Emigh | G06Q 10/107 |
| | | | 709/206 |
| 2013/0151628 A1* | 6/2013 | Catalano | G06Q 10/107 |
| | | | 709/206 |
| 2014/0259158 A1* | 9/2014 | Brown | G06F 21/554 |
| | | | 726/22 |
| 2015/0040218 A1* | 2/2015 | Alperovitch | H04L 63/0227 |
| | | | 726/22 |
| 2015/0381533 A1* | 12/2015 | Klemm | H04L 51/02 |
| | | | 709/206 |

OTHER PUBLICATIONS

Boykin, P. Oscar, and Vwani Roychowdhury. "Personal email networks: An effective anti-spam tool." arXiv preprint condmat/0402143 (2004).

Karagiannis, Thomas, and Milan Vojnovic. "Behavioral profiles for advanced email features." Proceedings of the 18$^{th}$ international conference on World wide web. ACM, 2009.

Li, Wei-Jen, Shlomo Hershkop, and Salvatore J. Stolfo. "Email archive analysis through graphical visualization." Proceedings of the 2004 ACM workshop on Visualization and data mining for computer security. ACM, 2004.

Muelder, Chris, and Kwan-Liu Ma. "Visualization of sanitized email logs for spam analysis." Visualization, 2007. APVIS'07. 2007 6th International Asia-Pacific Symposium on. IEEE, 2007.

\* cited by examiner

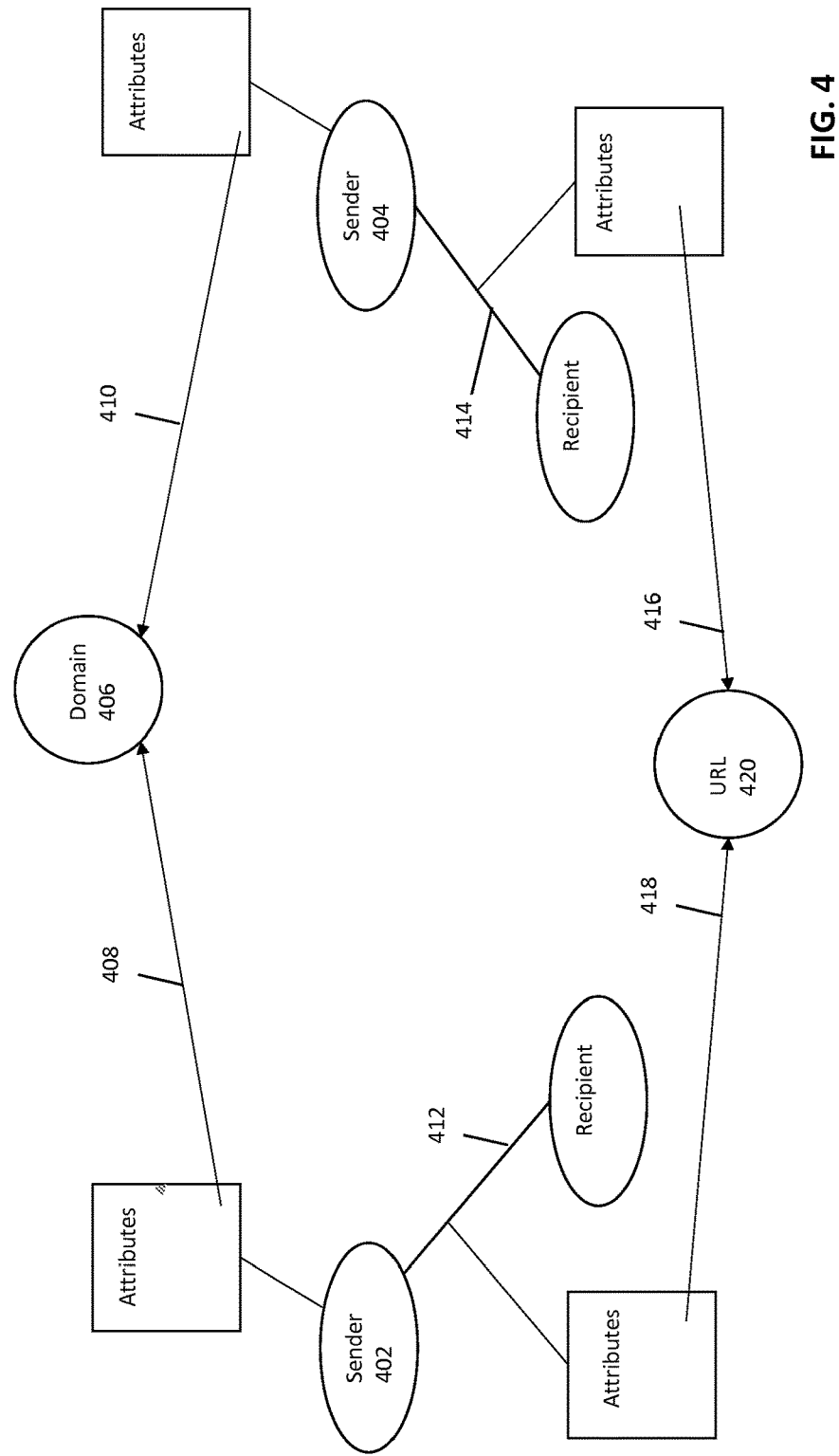

FIG. 5C
FIG. 5D
FIG. 5A
FIG. 5B

SYSTEMS AND METHODS FOR DETECTING AND/OR HANDLING TARGETED ATTACKS IN THE EMAIL CHANNEL

CROSS-REFERENCE TO RELATED APPLICATIONS

This application is a continuation of U.S. patent application Ser. No. 14/709,460 filed May 11, 2015, which claims the benefit of U.S. Provisional Patent Application No. 61/991,854 filed May 12, 2014, and U.S. Provisional Patent Application No. 62/116,856 filed Feb. 16, 2015, the contents of which are hereby incorporated in their entireties.

TECHNICAL FIELD

Certain example embodiments described herein relate to computer processing. More particularly, certain example embodiments relate to techniques for detecting and/or handling targeted attacks in electronic message systems.

BACKGROUND

The rapid growth of the Internet in recent years has brought cyber security to the forefront of critical issues for enterprises such as corporations and other entities. Today, many enterprises have almost all their critical and non-critical data resources in a manner that is reachable on-line via the Internet. Moreover, large numbers of employees of these enterprises are provided with access to email and/or other social media or electronic communication. Often employees access such electronic communication resources from within the computing environment of the enterprise.

High value enterprises are frequently targeted by cyber criminals, hactivists and nation states in order to steal intellectual property, trade secrets, sensitive information and customer data, to disrupt business operations and cause harm to businesses, or to obtain unauthorized access for any number of other reasons against the interests of these enterprises. Many enterprises make substantial investments in security technologies that protect against network and system vulnerabilities. However, these conventional efforts often do not adequately protect the enterprise from human vulnerabilities that pose similar or even greater security risks. Threat actors (e.g., cyber criminals, hactivists and nation states) frequently take advantage of human vulnerabilities in enterprise security posture through targeted attacks such as spear-phishing and longer term slow & low social engineering. These types of attacks leverage email to reach an unsuspecting email user in an enterprise. The content of these emails are designed to trick recipients of such emails into a potentially risky action such as, for example, opening an attachment, clicking on a weblink embedded in the email content, opening the email which then automatically activates malicious content, or simply providing requested sensitive information. These actions, once committed by an email user, may then result in compromising the security of the enterprise, further resulting in the threat actor finding a foothold within the enterprise for exfiltration of confidential and/or otherwise sensitive data or for exploitation of sensitive systems within the enterprise.

The tools and techniques used by threat actors keep changing and adapting to the conventional security techniques currently in use. In order to better protect enterprises from cyber threats, it is desirable to provide systems and techniques that can efficiently and effectively detect and/or handle various types of cyber attacks committed via communication channels, such as, email.

SUMMARY OF THE EXAMPLE EMBODIMENTS OF THE INVENTION

According to an embodiment a method of processing incoming email messages is provided. The method may include receiving aspects of an incoming email message addressed to a first email account holder, selecting a recipient interaction profile and/or a sender profile from a plurality of predetermined profiles stored in a memory based upon the received properties, determining a message trust rating associated with the incoming email message based upon the incoming email message and the selected recipient interaction profile and/or the sender profile; and generating an alert identifying the incoming email message as including a security risk based upon the determined message trust rating. The recipient interaction profile may include information associating the first email account holder and a plurality of email senders from whom email messages have previously been received for the first email account holder, and the sender profile may include information associating a sender of the incoming email message with characteristics determined from a plurality of email messages previously received from the sender In certain example embodiments, the method may further include updating, in the memory, at least one of the selected recipient interaction profile, the selected sender profile, or a data structure corresponding to a message from the sender to the first account holder, to record at least a portion of the received aspects and information regarding the determined message trust rating. The updating may further include changing, in the memory, at least one of a domain profile or a message transfer agent profile to record at least a portion of the received aspects and information regarding the determined message trust rating. One or more of the sender profile, the domain profile and the message transfer agent profile may include a respective associated trust rating, and wherein the updating further includes updating the respective associated trust rating at least partly in accordance with the determined message threat rating.

In certain example embodiments, the selecting may include selecting the recipient interaction profile and the sender profile, and the determining may include determining the message threat rating using the recipient interaction profile and the sender profile. The selecting further includes selecting, in addition to the recipient interaction profile and the sender profile, a sender domain profile corresponding to a domain of the incoming email message, and a sender message transfer agent profile corresponding to a message transfer agent identified in the incoming email message, and wherein the message security rating is determined based, in addition to the recipient interaction profile and the sender profile, upon the sender domain profile and the sender message transfer agent profile.

In certain example embodiments, the recipient interaction profile may include information regarding, for respective ones of the email messages received for the first email account holder, an action taken by the first email account holder.

In certain example embodiments, the recipient interaction profile may further include information regarding, for respective email senders from the plurality of email senders from whom email messages have previously been received for the first email account holder, one or more summary attributes characterizing messages sent by the respective email sender to the first account holder. The one or more summary attributes include a frequency of the email messages, a summary of actions taken by the first email account holder with respect to the email messages, and/or a summary of content of the email messages.

In certain example embodiments, the sender profile includes a status of the sender indicating a sender trust rating and at least one data pattern derived from previously received email messages by the email sender. The data pattern includes a pattern of email header field attributes determined from emails previously received from the email sender, the data pattern further includes a sender behavior pattern relating to sending of email messages by the email sender.

In certain example embodiments, the method further includes generating a graph representing a plurality of previously received email messages, forming the recipient interaction profile and the sender profile using the graph, and determining one or more of the recipient interaction profile and the sender profile based at least in part upon the graph. The graph comprises graph edges corresponding to respective email messages and graph nodes corresponding to email senders and recipients of said respective email messages, and wherein the recipient interaction profile and the sender profile may each be associated with respective graph nodes from the graph. The sender profile may include parameters determined based upon a plurality of email messages represented in the graph and information regarding the sender obtained from an online cyber threat intelligence resource. The parameters may include a sender trust rating for the sender. Each edge may include a disposition attribute representing an action taken by the first email account holder in response to the incoming email message. Each of the graph edges and each of the graph nodes has a respective set of immutable attributes and a respective set of derived attributes, wherein the immutable attributes are determined based upon a corresponding email message, and wherein the derived attributes are determined using (1) calculations using corresponding one or more email messages, and (2) information from a continuously updated external cyber threat intelligence resource, and (3) information from external databases like IP Address to Geo-location mapping.

Another example embodiment provides a system including at least one network interface, a memory, and at least one processor. The at least one processor can be configured to perform operations comprising receiving aspects of an incoming email message addressed to a first email account holder, where the aspects include properties of the incoming email message. The processor is further configured for selecting, from a plurality of predetermined profiles stored in the memory, a recipient interaction profile and/or a sender profile based upon the received properties, where the recipient interaction profile includes information associating the first email account holder and a plurality of email senders from whom email messages have previously been received for the first email account holder, and where the sender profile includes information associating a sender of the incoming email message with characteristics determined from a plurality of email messages previously received from the sender. The processor is further configured to determine a message threat rating associated with the incoming email message based upon the incoming email message and the selected recipient interaction profile and/or the sender profile, and generating an alert identifying the incoming email message as including a security risk based upon the determined message threat rating.

A non-transitory computer readable storage medium storing program code which, when executed by a processor of a computing device having a memory and at least one network interface, causes the computing device to perform operations including, receiving, over the at least one network interface, aspects of an incoming email message addressed to a first email account holder, wherein the aspects include properties of the incoming email message; selecting, from a plurality of predetermined profiles stored in the memory, a recipient interaction profile and/or a sender profile based upon the received properties, wherein the recipient interaction profile includes information associating the first email account holder and a plurality of email senders from whom email messages have previously been received for the first email account holder, and wherein the sender profile includes information associating a sender of the incoming email message with characteristics determined from a plurality of email messages previously received from the sender; based upon the incoming email message and the selected recipient interaction profile and/or the sender profile, determining a message threat rating associated with the incoming email message; and based upon the determined message threat rating, generating an alert identifying the incoming email message as including a security risk.

Other aspects, features, and advantages of embodiments will become apparent from the following detailed description when taken in conjunction with the accompanying drawings.

BRIEF DESCRIPTION OF THE DRAWINGS

The accompanying drawings facilitate an understanding of the various embodiments of this invention.

FIG. 4 illustrates a logical view of an email relationship graph in which certain nodes have some attribute values in common with other nodes, in accordance with some embodiments.

FIGS. 5A, 5B, 5C and 5D illustrate an email recipient interaction profile, an email sender profile, a sender domain profile, and a sender MTA profile, respectively, generated according to some embodiments.

DETAILED DESCRIPTION OF EXAMPLE EMBODIMENTS OF THE INVENTION

Figure 1:
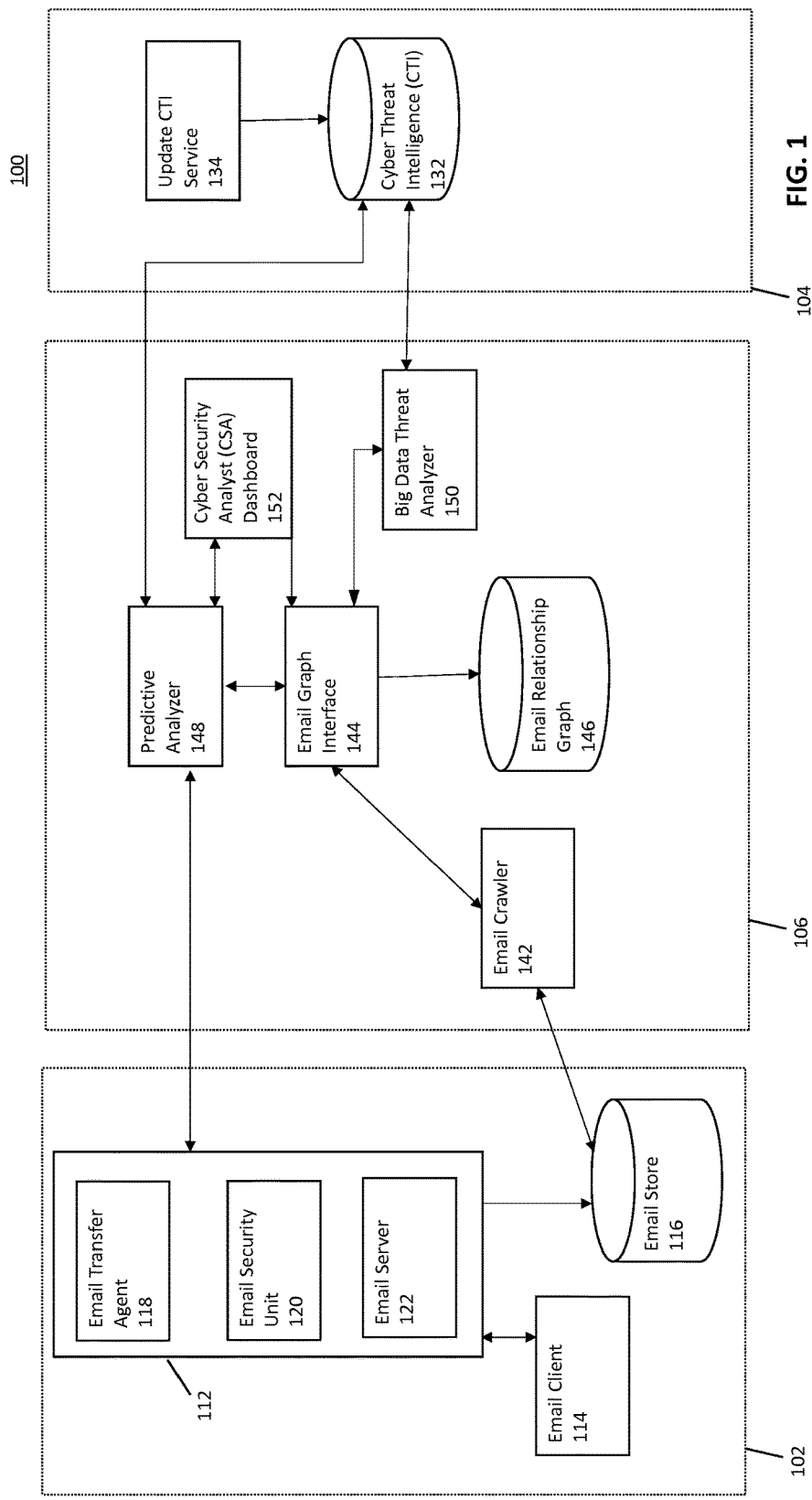
FIG. 1 schematically illustrates a system for detecting and/or handling targeted attacks in the email channel, according to some embodiments.

Various embodiments of the invention will now be described with reference to the figures. As indicated above, example embodiments are related to techniques for detecting and/or handling (e.g., protecting against) targeted attacks in electronic communication channels, such as, for example, email communications. As described in the background, conventional techniques may not be efficient or effective in detecting some types of targeted attacks in electronic communication channels. Example embodiments described herein are directed to detecting and/or handling such targeted attacks efficiently and with high effectiveness. Some example embodiments are configured, for example, to detect and/or handle targeted attacks such as phishing and slow-and-low social engineering using the email channel (e.g., email system) in an enterprise (e.g., corporation or other organization/group). Certain example embodiments may only perform detection of targeted attacks, whereas some embodiments may additionally be configured to handle detected attacks by triggering an action such as generating alerts and/or changing configurations in an enterprise's email system to either exclude the offending email message or to restrict the harm that such an email message can cause.

Certain example embodiments perform predictive analysis on each incoming email and/or on data extracted from the incoming email in order to determine whether the email message poses a threat (e.g., a security risk to data of the enterprise). The predictive analysis may be performed in real-time or near real time with the arrival of the email messages to the enterprise. An email message may be considered to pose a threat if the system determines that email message to be likely, for example, to contain a phishing attack, to be part of a slow-and-low social engineering attack, to include malicious weblinks, to contain malicious active content, to be an email from a known suspicious or malicious sender/actor, to include another type of email-based attack, or the like. The analysis may be based upon one or both of a recipient interaction profile or a sender profile which are determined based upon an email relationship graph that is dynamically generated by crawling the enterprise's email store(s). Additionally, other profiles, such as, for example, sender domain profiles and/or message transfer agent profiles that are also generated based upon previously received email messages, may be used in some embodiments. The analysis may also utilize a database of dynamically updated cyber threat intelligence information in making its determination regarding the presence of a threat. Moreover, a big data threat analytics unit may dynamically enhance the email relationship graph based upon data analytics on immutable attributes, derived attributes and various sources of cyber threat intelligence.

By making threat determinations based upon profiles generated using aspects of the enterprise's email store including the email relationship graph constructed therefrom and dynamic cyber threat intelligence, example embodiments provide enterprises with a high level of effectiveness in threat detection and adaptability to new and evolving target attacks. For example, by constructing the profiles based upon the enterprise's email store(s), efficient and customized detection of suspicious and/or malicious email messages is facilitated. By incorporating current cyber threat intelligence information in the determination, aspects (e.g., collective threat intelligence) from beyond the boundaries of the enterprise too are brought into consideration in making a determination regarding the security risk level associated with an incoming email message.

Some embodiments, particularly those that operate away from the main processing path of incoming email messages, can seamlessly scale to large volumes and/or a high frequency of incoming email messages while keeping the interference (e.g., delaying delivery of incoming email messages to recipients) with the enterprise's email flow to a minimum. Still further, some embodiments may configurably alert a cyber security analyst (CSA), or other such operator who is capable of taking risk mitigating actions, when an incoming email message is identified as posing a threat, thereby minimizing any harm caused by any false positive identification of threat emails.

FIG. 1 illustrates a system 100 for detecting and/or handling targeted attacks in the email channel of an enterprise, according to some embodiments. The components of system 100 belong to at least three subsystems 102, 104 and 106. Subsystem 102 includes components for receiving incoming emails in an enterprise. Subsystem 104 includes components for cyber threat intelligence integration, collection and/or distribution. Subsystem 106 comprises components that operate, in cooperation with subsystems 102 and 104, to detect and/or handle targeted attacks in the email channel of the enterprise.

Incoming mail system 112 receives emails incoming to the enterprise from the Internet or other network. The incoming mail system 112 may include one or more computers and/or servers that are at one or more geographic locations.

An email client 114, which may be executing on a computing device operated by an end user, such as an intended recipient of an email message, may obtain the incoming email from incoming mail system 112. The email client 114 may, for example, include a Microsoft Outlook Client™, but clients are not limited to Outlook™ or any particular email client. Email client 114 may include client applications on smart phones, wearable computing devices, tablets, laptops, personal computers, etc.

The incoming mail system 112 may store received emails in an email store 116. The email store 116 may include emails received for all employees of the enterprise for any length of time. For example, email store 116 may include all emails received by the enterprise over a predetermined period, such as, a number of preceding months, a number of years, or since storing of emails was commenced in the enterprise. Email store 116 may be stored in any type of digital storage such as, for example, non-volatile memories, volatile memories, or a combination thereof. Email store 116 may include any conventional email store and/or may include any email collection accessible through an email server.

The incoming mail system 112 may include an email transfer agent 118, an email security unit 120 and an email server 122 that process the incoming email messages before the email message is provided to the end user via a client 114. The email transfer agent 118 operates to interact with sending email transfer agents from outside the enterprise to receive email messages destined for email users having an email address within the enterprise. Email transfer agent 118 may include an entity generally referred to as the MTA ("Mail Transfer Agent") in email systems. MTA's communicate with each other using a protocol such as SMTP (Simple Mail Transfer Protocol). Configurations for MTA's may be based upon what are known in email systems, such as MX records. For example, for each MTA, a corresponding MX record will advertise its capabilities and/or operating email domains, so that other MTAs can use that information in deciding how and where to forward emails.

Email security unit 120 may include any hardware and/or software that performs gateway functions and/or some security processing for incoming emails. Email gateway functions and/or security processing by the security unit 120 may include, for example, automatic decryption of encrypted incoming emails, filtering based upon keywords etc. Example, security unites may include IronPort™ from Cisco Systems. IronPort™ may be configured to perform spam filtering, malware filtering etc.

Email server 122 accepts email messages that are either passed-through or determined as safe by the security unit 120. Email server 122 may then store the email message, provide client 114 a notification and/or access to the received email, and/or store the email message in store 116.

Subsystem 104 includes a cyber threat intelligence (CTI) database 132 and a CTI updater 134 that collectively operate to collect and distribute cyber threat intelligence via a network such as the Internet. CTI may include information about known attack campaigns, known malicious web links, known malicious attachments, known malicious email senders and/or domains, malicious IP addresses, spam campaigns, phishing campaigns, etc. CTI database 132 may include any type of data storage and may, in some embodiments, store the data in a database system. CTI updater 134 operates to dynamically update the CTI database 132 in accordance with information received from one or more monitoring entities, through, for example, the Internet. Updates may be received from internal or external threat intelligence providers to keep CTI database 134 updated with the most current (e.g., up to the minute, up to the hour, etc.) threat information.

In subsystem 106, an email crawler 142, an email relationship graph interface 144, an email relation graph 146, a predictive analyzer 148, a big data threat analyzer 150, and CSA dashboard 152 operate, in collaboration with components of subsystems 102 and 104, to detect and/or handle targeted attacks in the email channel.

Email crawler 142 operates to analyze email store 116 in order to determine aspects of email use in the enterprise, and to, using those determined aspects, add to or update email relationship graph 146. In some example embodiments, crawler 112 "crawls" email store 116 to access respective stored emails and, for respective stored emails, extract information such as sender, recipient, sender domain, other recipients, attachments in message content, web links etc. in message content, and/or to compute hashes of attachments. In some embodiments, email crawler 142 may also perform functions such as counting the number of messages that satisfy certain specified criteria. This information is then used to either add one or more new nodes and/or edges in the email relationship graph 146, and/or to update one or more attributes in email relationship graph 146. Email crawler 142 may use any technique to access and analyze email store 116 that efficiently yields the information required for email relationship graph 146. In some embodiments, email crawler 142 may process each newly added record corresponding to a new incoming massage, and make corresponding updates to email relationship graph 146. In some other embodiments, email crawler 142 may, upon processing a record for one email message, search and access a second email record that is related (e.g., same sender, same recipient, same content, etc.) so that the second record can be processed in relation to the first.

In some embodiments, email crawler 142 may include an email header analyzer that parses email header data into name-value pairs for predetermined attributes such as attributes defined in the SMTP protocol. An email content meta-analyzer may perform simple text analysis on the email body to extract metadata like URLs, email addresses, IP addresses, etc. An email attachment meta-analyzer may perform simple text and computational analysis on any attachments like file type/extensions, hash values etc. Email crawler 142 may then use the output generated by the analyzers including email header analyzer and transform it into aspects of the email relationship graph 146.

Still further, email crawler 142 may include an email action transform for retrieving actions taken by the recipient for each email received and store them in the email relationship graph. For example, when an email is received by a recipient, the recipient can take any of the following actions in response; open/read the email, reply to the email, forward the email, move the email to a folder, mark the email as junk, delete the email, or delete without reading the email etc. These actions are stored as attributes of the edge from the sender to the recipient in the email relationship graph.

Email graph interface 144 provides an interface by which other components can access the email relationship graph 146. The email relationship graph 146 relates email senders and recipients based upon respective messages. According to some embodiments, email senders and email recipients are represented by nodes of email relationship graph 146 and the email message is represented by an edge in email relationship graph 146. Attributes stored in relation to nodes and edges represent various immutable features, and derived features associated with the nodes and/or edges. Immutable attributes include features that can be extracted from an email message in itself, and derived attributes include features that are determined based upon relationships among different messages, senders and/or recipients or computed by email crawler 142 (e.g., hash value of attachments). Immutable attributes may be populated by email crawler 142. Derived attributes may be populated by email crawler 142, big data threat analyzer 150 and/or CSA dashboard 152.

Figure 2:
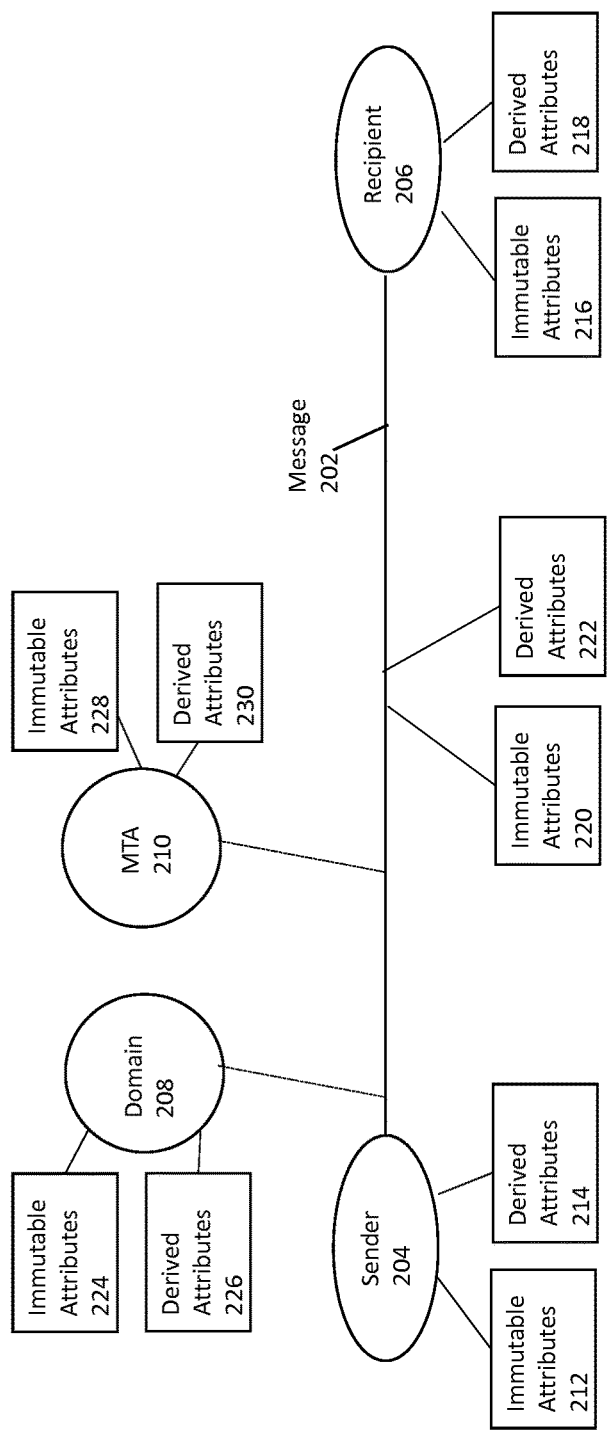
FIG. 2 illustrates a logical representation of an email message in a memory storage in a system for detecting and/or handling targeted attacks in the email channel, according to some embodiments.

Any type of database may be used to store the email relationship graph 146. In an example embodiment, a graph database such as Titan™ from DataStax of California, US can be used to store email relationship graph 146. FIG. 2 illustrates a logical representation of an email message 202 sent by sender 204 to recipient 206, in email relationship graph 146. Sender 204 is associated with its immutable attributes 212 and derived attributes 214. Recipient 206 is associated with its immutable attributes 216 and derived attributes 218. Message 202 too is associated with its immutable attributes 220 and derived attributes 222.

In some embodiments, message 202 and/or sender 204 may additionally be logically associated with a sender domain 208 and/or a sender MTA 210 represented as special nodes in the email relationship graph. Sender domain 208 may be associated with immutable attributes 224 and derived attributes 226. Sender MTA 210 may be associated with immutable attributes 228 and derived attributes 230. The sender, receiver, sender domain and sender MTA information can be obtained from the header of each email message.

Email graph interface 144 can be accessed by email crawler 142 in order to add and/or update graph 146 in accordance with newly added records in email store 116. Big data threat analyzer 150 is configured to access email graph interface 144 in order to update graph 146 in accordance with determinations made by the big data threat analyzer 150. Predictive analyzer 148 is configured to access email graph interface 144 in order to query the graph 146 and/or to update the graph 146 in accordance with determined information. CSA dashboard 152 may operate to access email graph interface 144 in order to display information derived from graph 146 on a display device (not shown) viewable by a user (e.g., a CSA) and also update email relationship graph 146.

Email crawler 142 may also extract from email store 116 and store in graph 146, actions (e.g., read message, not read message, reply, forward, delete, save, report as junk etc.) taken by a recipient in response to receiving an email message as attributes of the message represented by the edge between a sender and recipient. Actions taken by recipient may be classified into read/not-read, reply, forward, delete, save, report as junk, etc. Explicitly storing the recipient actions as an attribute of the edge representing the corresponding message provides example embodiments with a high level of efficiency and flexibility when making threat determinations and when computing profiles such as recipient interaction profiles and sender profiles.

Immutable attributes may be associated with any of sender nodes, recipient nodes, message edges, sender domain special nodes, sender MTA special nodes in email relationship graph 146. Sender immutable attributes may include, for example, email address, from (name), domain name, and sender MTA(s). Recipient immutable attributes may include, for example, email address, to (name), and domain name. Sender domain immutable attributes may include, for example, the domain name, and one or more MTAs associated (e.g., MTA for sending messages out of the domain) with the domain. Sender MTA immutable attributes may include, for example, one or more domains that use the MTA (e.g., domain that sends messages out using the MTA), and IP Address of the MTA.

Immutable attributes associated with message edges may include certain values extractable from the header of the email message, for example, unique identifier for the message, time at which the message was sent, sender (e.g., IETF Request for Comment (RFC) 1123, 1036), recipient(s) (e.g., RFC 822, 1123), subject, whether message is encrypted, whether message is signed, embedded URLs, embedded email addresses, attachment type(s), attachment hash value(s), blind carbon copy (i.e., bcc, e.g., RFC 822, 1123) indicating recipient(s) not be disclosed to other recipients, carbon copy (i.e., cc, e.g., RFC 822, 1123) indicating secondary recipient(s), content type (e.g., RFC 1049, 1123, 2045, 1766) indicating type and format of content, time (e.g., RFC 822, 1123, 1036) when the message was written (or submitted), delivered to information, time (e.g., RFC 2156) when a message was delivered to its recipient, subject of the email message (e.g., RFC 822, 1036), and SMTP defined header attributes.

Other example immutable attributes include, indication (e.g., RFC 2156) whether the message may be forwarded to alternate recipients, apparently-to field (e.g., RFC 1211) indicating recipients derived from message envelope, indication (e.g., RFC 1036) of a newsgroup or mailing list message, indication (e.g., RFC 2156) whether the message has been automatically forwarded, comments (e.g., RFC 822, 1123) added to the message, content base (e.g., RFC 2110) to be used for resolving relative uniform resource indicators, indications (e.g., RFC 1806, 2183) whether MIME body part is to be shown inline or as an attachment, content language (e.g., RFC 1766) used in the message, checksum (e.g., RFC 1864) of content, indication (e.g., RFC 2156) whether the content of a message is to be returned with non-delivery notifications, coding (e.g., RFC 2045) method used in a MIME message body, indication (e.g., RFC 2156) whether recipients are to be told the names of other recipients, disposition notification options (e.g., RFC 2298) for notification to be sent when the message is received, requests (e.g., RFC 2298) for notification when the message is received, DKIM signature, domainkey signature, address to which notification are to be sent, indication (e.g., RFC 1036) of suggested expiration time, expiry indication (e.g., RFC 2156) of when the message loses its validity, indication (e.g., RFC 2156, 2421) about how important a message is, reference (e.g., RFC 822) message which this message is a reply to, indication (e.g., RFC 2156) that message body parts are missing, keywords (e.g., RFC 1036) used as an aid in determining if the message is interesting to the reader, indication (e.g., RFC 2156) that this message is a delivery report gatewayed from X.400, MIME version (e.g., RFC 2045) for the message, indication (e.g., RFC 2156) that a reference to previous message being corrected and replaced, organization (e.g., RFC 1036) to which the sender belongs, body types (e.g. RFC 2156) in this message, original recipient (e.g., RFC 2298), path (e.g., RFC 1036) indicating a list of MTAs which the message has passed, indication (e.g. RFC 2156) whether non-delivery report is wanted at delivery error, priority (e.g., RFC 2156) for message delivery, trace (e.g., RFC 822, 1123) of MTAs which the message has passed, references (e.g., RFC 822, 1123) indicating in e-mail to other related messages, latest time (e.g., RFC 2156) at which a reply is requested, suggested e-mail address (e.g., RFC 822, 1036) for replies, indication (e.g., RFC 822) that this message is the bcc of a forwarded message, indication (e.g., RFC 822) that this message is the cc of a forwarded message, message resend information (e.g., date, from, message identifier), return path data (e.g., RFC 821, 1123) passed from mail envelope, indication (e.g., RFC 2156, 2421) of how sensitive it is to disclose this message to other people than the specified recipients, summary (e.g., RFC 1036) indicating short text describing a longer article, client software used by the originator, etc.

Derived attributes may include sender derived attributes, recipient derived attributes, message derived attributes, sender domain derived attributes, and sender MTA derived attributes. Sender derived attributes may include a classification of the sender as one of unknown, known, trusted, suspicious, or malicious. This classification, referred to sometimes as a sender trust rating, may be considered as a security risk status and/or trust level associated with the sender. Derived attributes may be determined by the email crawler 142 or big data threat analyzer 150, or may be assigned by an operator, such as, for example, a CSA.

The sender is classified as one of the above based on many factors such as number of edges originating from the sender temporal history of edges originating from the sender, edges originating from other nodes (e.g., recipient) into the sender. Temporal history of these edges, explicit actions such as reply, forward, mark as junk etc. taken by the recipient. The technique of classifying a sender as unknown, known, trusted, etc. based on the sender's interaction with recipients and recipients' responses to messages sent to them provides unique advantages and efficiencies to embodiments.

Recipient derived attributes may include information regarding received messages and actions taken by the recipient. Example attributes that may be associated with the recipient are described below in relation to FIG. 5A.

Message derived attributes may include a classification of the message as spam, email marketing, newsletter, suspicious, malicious (e.g., phishing, spear phishing, slow-and-low-attack, malicious link, malicious attachment) etc.

Sender domain special nodes and sender MTA special nodes may each have one or more derived attributes including a derived attribute representing a respective trust rating classifying each into one of a plurality of trust levels. For example, the trust rating for sender domain special nodes and sender MTA special nodes may include categories unknown, neutral, trusted, suspicious, and malicious. The trust rating for sender domain special nodes and sender MTA special nodes may be assigned by big data threat analyzer 150 and/or an operator such as, for example, a CSA. The big data threat analyzer 150, for example, can assign a trust rating based upon the trust rating of the majority of email messages originating in the corresponding sender domain and/or using the corresponding sender MTA.

Metadata of a message are stored as attributes of the edge between the sender and recipient(s). These attributes are analyzed (along with the attributes of the sender, and in some embodiments, the corresponding sender domain and sender MTA) by big data threat analyzer 150 to determine and classify the message as any of a plurality of types of attacks as phishing, spear phishing, slow-and-low-attack etc. Consequently, unlike conventional systems, certain example of this invention can identify targeted attacks such as spear phishing and slow-and-low-attack. Slow-and-low-attack can transcend several messages sent by a sender whereby the sender slowly builds trust with the recipient with the intent of launching a spear phishing attack in future.

Predictive analyzer 148 operates to evaluate each incoming email to determine whether it poses a threat to the enterprise. The information regarding the incoming email and/or the incoming email itself is provided to the predictive analyzer 148 by the incoming mail system 112. In some embodiments, the information regarding the incoming email and/or the incoming email itself is provided to the predictive analyzer 148 by the email security unit 120 in the incoming mail system 112. In accordance with its determinations, in some embodiments, the predictive analyzer may operate to configure aspects of the incoming mail system 112 or email security unit 120. For example, if predictive analyzer 148 determines that a certain domain is currently causing a surge of attacks, action may be taken to block an incoming mail from that domain at the email security unit 120 or at the incoming mail system 112. Such an action may be a request to block the particular domain being communicated to email security unit 120, upon receipt of which it effects a filter configuration or the like to implement the requested blocking.

Predictive analyzer 148, after receiving the incoming email or information regarding the incoming email from incoming mail system 112, then uses information from email relationship graph 146 and CTI database 132 to arrive at a determination as to whether the incoming email poses a threat. The graph 146 and database 132 can be accessed based upon any combination of sender, recipient, sender domain, message type, message content, attachments, etc.

Big data threat analyzer 150 operates to perform data analysis on known cyber threat information repositories, including, for example, the cyber threat intelligence database 132 and on the email relationship graph 146. For example, in order to determine a status of a particular sender, big data threat analyzer 150 may first evaluate all or some messages sent by the particular sender and then also check a status for the particular sender with the CTI database 132. The determinations made are then used by big data threat analyzer 150 to update graph 146. For example, big data threat analyzer 150 can update nodes and/or edges of graph 146 to include one or more derived attributes. Big data threat analyzer 150 may include configured heuristic rules and algorithms to perform updates to derived attributes of the email relationship graph 146. In certain example embodiments, big data threat analyzer 150 may determine, and update graph 146, according to the following example aspects:

characteristics of unknown sender—if a sender has no prior history (e.g., absence of anode in graph 146 representing the sender) of sending a message to any recipient in the enterprise and the sender is not associated with malicious activities (e.g., sending spam, email attacks etc.) in the CTI database 132, then the sender is marked as an unknown;

characteristics of known sender—if a sender has prior history of sending message(s) to recipients in the enterprise and it can't be determined if sender is a trusted sender and the sender is not associated with malicious activities in the CTI database 132, then the sender is marked as known;

characteristics of trusted sender—if a sender has prior history of sending messages to the recipient and has received favorable actions like reply, forward, message filed in a folder, message marked for follow up etc. and the sender is not associated with malicious activities in the CTI database 132 then the sender is considered trusted;

characteristics of suspicious sender—if a sender has prior history of sending messages to recipients in the target organization but has never or very rarely received a favorable actions like reply, forward, etc. and may have received unfavorable actions like marked as junk, deleted without open, and the sender is not associated with malicious activities in the CTI database 132, then the sender is considered suspicious;

characteristics of malicious sender—if a sender has prior history of sending messages to recipients in the target organization but has never received a favorable action and may have received unfavorable actions like marked as junk, deleted without reply etc. or the sender is associated with malicious activities in the CTI database 132, then the sender is marked as malicious;

characteristics of spam—if an email message is associated with a sender that is associated with sending spam, or the sender is an unknown sender and has sent exactly the same message to several recipients in the enterprise, or the sender is a malicious sender and the message is not a malicious message then the message is marked as spam;

characteristics of email marketing—if an email message is associated with a sender that's associated with sending email marketing, or the message attributes like multiple links, links to track user actions and the message is not a malicious message then the message is marked as email marketing;

characteristics of newsletter—if an email is associated with a sender that is associated with sending newsletters, or the message has attributes like 'unsubscribe' etc. that indicate a newsletter then the message is marked as newsletter;

characteristics of trusted message—if the message is from a known or trusted sender and the sender attributes conform to the sender profile for example time of day when message are usually sent by this sender, IP Address and/or hops usually taken by the messages sent by the sender etc. and the message does not contain any malicious links or malicious attachments then the message is marked as trusted message;

characteristics of suspicious message—if the message is sent by a suspicious sender, or the message is sent by an unknown sender and the message contains link(s) or attachment(s) then the message is marked as suspicious message; and characteristics of malicious message—if the message is sent by a malicious sender, or the sender attributes don't conform to sender profile or the message contains link(s) or attachment(s) that are deemed malicious by CTI database 132, then the message is marked as a malicious message.

Big data threat analyzer 150 may further classify an identified malicious message into following categories based upon further analysis:

characteristics of slow-low-attack—this kind of attack spans several messages from the sender to the recipient, where the initial interaction of the sender may start as an unknown sender and gradually progress to a trusted sender with respect to the recipient during a phase of progression the sender may launch an attack on the recipient;

characteristics of phishing attack—this kind of attack is an attempt to collect sensitive information from the recipient(s), usually by sending similar message to many recipients within the enterprise with the hope that some percentage of recipients will take the bait and provide the requested information;

characteristics of spear-phishing attack—this is an attack similar in nature to a phishing attack, sent to one and only one recipient in the enterprise (e.g., such attacks usually come from unknown, suspicious or malicious senders targeting recipients holding senior or sensitive positions within the enterprise);

characteristics of malware-link—a URL that downloads a binary file, and for which the IP address, domain name or the full URL might have malicious history associated with it that can be looked up in CTI database 132 (e.g., behavioral analysis of the URL—clicking on it and recording the redirects and the resulting IP address may result in discovery of malicious history); and characteristics of malware attachment—an attachment that is known to be malicious through CTI database lookup, which uses a suspicious binary format, or which contains known malicious URL link(s).

As noted above, sender domain and sender MTA, which are represented in graph 146 as special nodes, are also each classified into one of a plurality of trust ratings, such as, for example, unknown, neutral, trusted, suspicious, malicious, reflecting a trust level to consider in evaluating messages originated therefrom.

Big data threat analyzer 150 interacts with the email relationship graph 146 and CTI database 132 to determine derived attributes of senders, recipients, and messages and create a baseline of existing data in the email relationship graph 146. In some embodiments, derived attributes are determined for sender domains and/or sender MTAs. The derived attributes, in some embodiments together with at least some immutable attributes, of a sender and a recipient constitute profiles such as sender profiles, recipient interaction profiles, sender domain profiles and sender MTA profiles, which are leveraged by predictive analyzer 148 to analyze incoming emails in real-time. CSA dashboard 152 operates to provide a human operator, such as, for example, a CSA, a view into the threat environment. The threat environment is represented based upon information from graph 146 and predictive analyzer 148. For example, the predictive analyzer 146 may notify (e.g., by sending an alert) the CSA dashboard 152 about a just received email message that is determined as a threat. The CSA dashboard can then query the graph 146, through the interface 144, to obtain information regarding the sender, recipient and/or message type. CSA dashboard 152 provides rich visualization of insights into the threat environment. Data visualization allows for interactive drill down by the CSA of the targeted attacks and malicious senders. According to some embodiments, CSA dashboard 152 includes software that displays the threat environment information on a display. The CSA dashboard 152, in some embodiments, may also include one or more displays.

CSA dashboard 152 may operate to provide the CSA with information such as, for example: list of suspicious senders along with data points that led to a threat classification; list of malicious senders along with data points that led this classification; list of suspicious insiders along with data points that led to this classification; list of malicious insiders along with data points that led to this classification; list of slow-low-attacks for a given period of time (e.g. with associated details drill down); list of phishing attacks and details; list of spear phishing attacks and details; list of malicious emails with malicious links and details; list of malicious emails with malicious attachment and details; and list of alerts in chronological order with severity (e.g., high, medium, low) and details.

CSA dashboard 152 can also be configured to query the graph 146. The queries may be such as, for example: list of all recipients that received messages from a specified sender; list of all messages sent by a specified sender; list of all messages sent by a specified sender to a specified recipient; list of all recipients that received a specified message; and list of all senders that have sent messages to a specified recipient.

Figure 3:
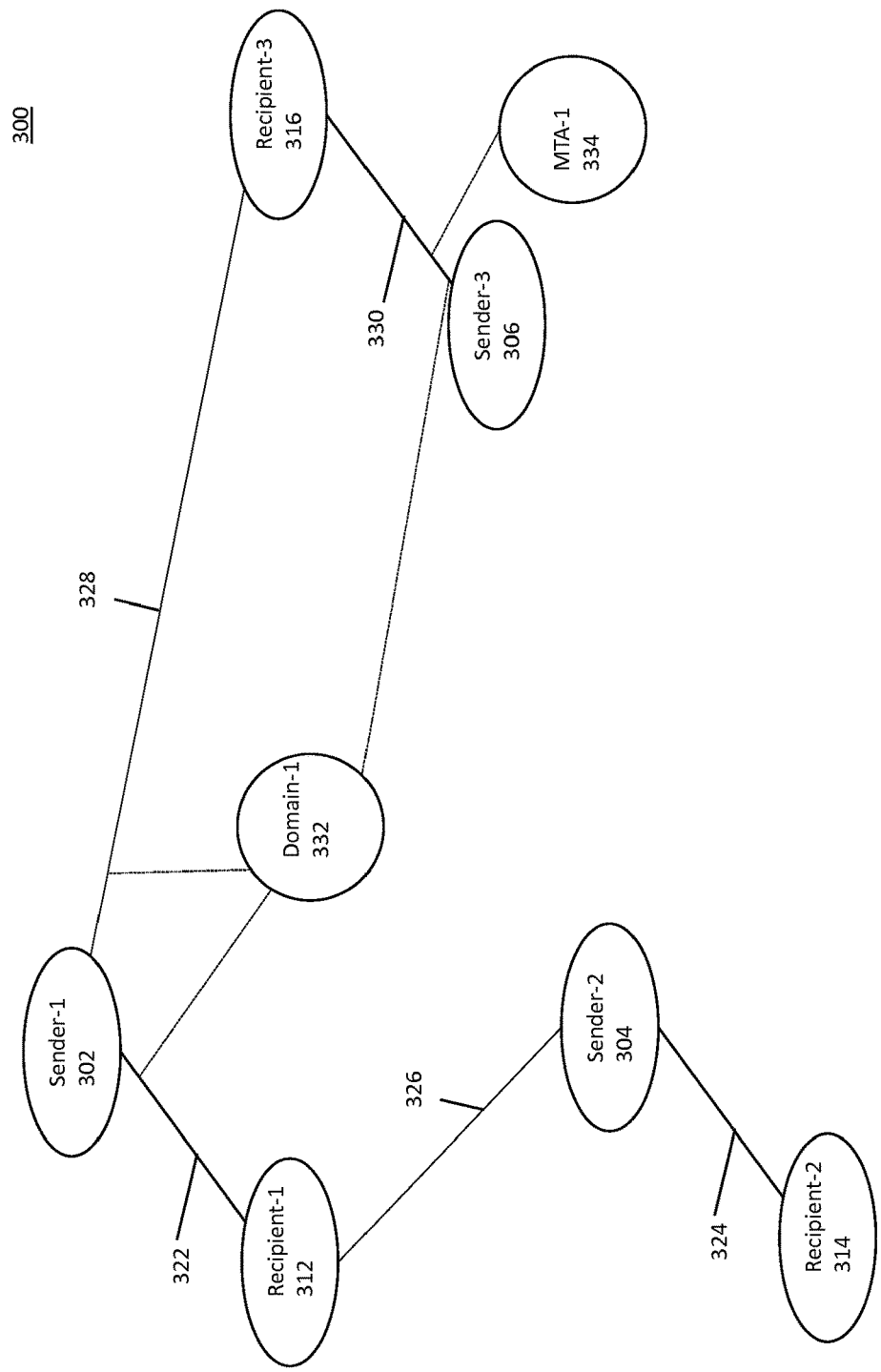
FIG. 3 illustrates a logical view of an email relationship graph representing inter-relationships established based upon email messages, according to some embodiments.

FIG. 3 illustrates a part of an email relationship graph 300, such as graph 146, according to some embodiments. The illustrated portion shows messages 322, 324, 326, 328 and 330 represented in graph 300. Message 322 is from sender 302 to recipient 312. Message 324 is from sender 304 to recipient 314. Message 326 is from sender 304 to recipient 312. Message 328 is from sender 302 to recipient 316. Message 330 is from sender 306 to recipient 316. As shown in FIG. 3, graph 300 represents recipient 312 receiving messages from both sender 304 and sender 302. Similarly, recipient 316 receives messages from senders 302 and 306. Special node domain-1 332 is logically connected (illustrated by dashed lines) to messages 322 and 328 sent by sender-1 302, and to message 330 sent by sender-3 306. Based upon the representation in FIG. 3, sender-1302 and sender-3 306 belong to the same domain domain-1332. Additionally, message 330 is also logically associated with another special node 334 which represents a MTA MTA-1. Thus, according to the representation in FIG. 3, message 330, and therefore sender 3, are associated with domain-1 and MTA-1. In some embodiments, special nodes representing domains and MTA are logically connected to corresponding message edges and sender nodes, and in yet other embodiments they may be logically connected only to corresponding sender nodes. A special node may be implemented as a regular graph node (e.g., similar to nodes representing senders or receivers) but without its own edges (e.g., without a message edge being between two domain nodes or two MTA nodes), and may instead logically associate itself with corresponding edges and/or nodes. This representation can be scalably extended to large numbers of messages and/or senders and recipients, and may only be limited by processing speed and memory of the platform on which the processing and/or storing of the graph is performed. In some embodiments multiple messages between the same sender and recipient pair may be represented as separate edges between the same nodes.

The arranging of email relationship graph 146 enables the efficient and flexible determination of all senders from whom a particular recipient has received email messages, the set of all recipients in the enterprise who have received an email message from a particular sender, and the determination of characteristics of each email message. Storing of the recipient's action explicitly in the corresponding edge, and storing a trust rating as an attribute are example aspects which provide added efficiency and flexibility. This organization, for example, enables efficient calculation of sender profiles and recipient interaction profiles.

In certain example embodiments, threat determination is further enhanced by making it faster and more efficient to relate different messages based upon at least some of their attributes. FIG. 4 illustrates a portion of an implementation of email relationship graph 146 where associations among attributes in different messages, senders and/or recipients, are themselves related to each other. In FIG. 4, each of the senders 402 and 404 are shown with their attributes. For each sender, the domain name attribute may logically associate (e.g., via pointers 408 and 410) a same memory location 406 that corresponds to a particular domain (e.g., a special node in graph 146 for a domain) associated with both the senders. Faster and more efficient determination of senders of a particular domain can be found. Similarly, messages 412 and 414 have pointers 418 and 416 associated with their attribute for embedded URL pointing to a same memory location 420, thereby enabling quick identification of messages having the same embedded URL.

FIGS. 5A and 5B illustrate an example recipient interaction profile 502 and an example sender profile 522, respectively, according to some embodiments. Each email recipient in an enterprise may have a respective recipient interaction profile 502, and each sender known to the email system of the enterprise (e.g., senders from whom at least one email has previously been received) may have a respective sender profile 522. In some embodiments, profiles 502 and 522 may be stored in a memory separately from graph 146. In some other embodiments, profiles 502 and 522 are created and maintained as an attribute (e.g., derived attribute) of the respective node in email relationship graph 146. Profiles 502 and 522 may be created and maintained (e.g., updated at intervals) by big data threat analyzer 150. In some embodiments, big data analyzer 150 or other component, may be configured to share sender profiles with other enterprises. For example, a sender profile in which a sender identified as malicious may be shared with one or more other enterprises.

Example recipient interaction profile 502 as shown in FIG. 5A includes information (e.g., a unique identification, full email address) identifying the recipient 504, and a plurality of attributes 506. The plurality of attributes 506 may include one or more of sender domains recipient has sent emails to, sender domains recipient has received emails from, sender domains recipients has received emails from but never replied, MTAs that recipient has received emails from, MTAs that recipient has received emails from and never replied to, MTAs that recipient has received email from and never opened, senders from whom recipient has received emails, senders to who recipient has never replied, senders for whom recipient has never opened email, new sender emails that has no attachment, new sender emails that has an attachment, new sender emails that has an attachment and were replied, new sender emails that has an attachment and were not opened, new sender emails that has no URL, new sender emails that has a URL, new sender emails that has a URL and were replied, new sender emails that has a URL and were not opened, number of emails received from a particular sender, number of emails replied for this sender, number of emails replied that contain an attachment, number of emails replied that contain a URL, number of emails opened but not replied, number of emails opened but not replied that contain an attachment, number of emails opened but not replied that contains a URL, number of emails from this sender not opened, number of emails from this sender not opened that contain an attachment, number of emails from this sender not opened that contain a URL, number of emails sent to this sender, number of email replies received from this sender.

As shown in FIG. 5B, example sender profile 522 includes information (e.g., unique identification, full email address) identifying the sender 524, attributes 526 (such as time of day information indicating one or more time period during which the sender is known to send email messages, number of hops information indicating the range of values for the number of hops traversed by email messages from the sender, and IP address information indicating IP addresses usually associated with the sender) and a sender trust rating 530.

A sender fingerprint may be determined from attributes 526 and may comprise a plurality of selected attributes selected as a sender fingerprint 528 that, for example, can identify a sender independently from the senders full email address. In some embodiments, the fingerprint may uniquely identify a sender. A significant deviation from a sender finger print may indicate an email sent from a "hacked" account (e.g., where the actual originator of the email is pretending to be the entity identified by the purported full email address). In some embodiments, the sender fingerprint may include the sender email address. In some embodiments, the sender fingerprint represents a particular sender's behavior with respect to sending messages to recipients in the enterprise. The fingerprint may be formed as a pattern of values of a selected set of the sender's attributes.

In addition to, or alternatively to attributes shown in FIG. 5B, example attributes that may be included in the sender profile and/or sender fingerprint may include one or more of return-path (e.g., sender@senderdomain), hops traversed by email (e.g., {aaa.aaa.aaa.aaa}), sender mail server (e.g., from mailserver.senderdomain.tld {aaa.aaa.aaa.aaa}, sender MTA), sender hostname (e.g., from senderhostname {aaa.aaa.aaa.aaa}), envelope-from (e.g., sender@senderdomain.tld), from entity (e.g., sender name <sender@senderdomain>), X-Mailer (e.g., mail client), all X-headers included in emails from this sender, accept language, content language, content transfer encoding, MIME version, reply-to, content type, X-Originating-IP, received sender policy framework, DKIM (domain keys identified mail), DMARC (domain-based message authentication reporting and conformance), authentication results, time: e.g., time range when the sender sends messages), and locations: (e.g., places from where the sender sends messages). The sender trust rating may be one of the values unrated (e.g., unknown), neutral (e.g., known), trusted, suspicious, or malicious. The sender trust rating may be determined based on one or more of length of time sender has known the enterprise, number of recipients in the enterprise the sender interacts with sender vs. enterprise originated message ratio, sender messages open vs. not-open ratio, number of emails received from this sender, number of emails opened, number of emails opened but not replied, number of emails opened but not replied that contain an attachment, number of emails opened but not replied that contains a URL, number of emails replied for this sender, number of emails replied that contain an attachment, number of emails replied that contain a URL, number of emails from this sender not opened, number of emails from this sender not opened that contain an attachment, number of emails from this sender not opened that contain a URL, number of emails sent to this sender, number of email replies received from this sender.

FIG. 5C illustrates an example sender domain profile 532. Sender domain profile 532 may include a domain identifier 534, set of attributes 536, some of which define a fingerprint 538 for the sender domain, and a sender domain trust rating 540. The set of attributes 536 may include one or more of a list of MTAs associated with the domain, SPF-DNS TXT RR (DNS resource record(s) identifying a sender policy framework—SPF, SPF identifies MTA and/or host authorized to send emails on behalf of a domain). The sender domain trust rating 540 may categorize the sender domain as one of unrated, neutral, trusted, suspicious, or malicious. The sender domain trust rating may be considered an indicator of the level of security risk and/or a trust level associated with the sender domain. The features considered in determining the trust rating may include one or more of length of time sender domain has sent emails to the enterprise, number of senders from this sender domain interacting with the enterprise, number of recipients in the enterprise the sender domain interacts with organization vs. sender domain originated message ratio, sender domain messages open vs. not-open ratio, number of emails received from this sender domain, number of emails opened, number of emails opened but not replied, number of emails opened but not replied that contain an attachment, number of emails opened but not replied that contain a URL, number of emails replied for this sender domain, number of emails replied that contain an attachment, number of emails replied that contain a URL, number of emails from this sender not opened, number of emails not opened that contain an attachment, number of emails not opened that contain a URL, number of emails sent to this sender, number of email replies received from this sender.

FIG. 5D illustrates an example sender MTA profile 552. Sender MTA profile 552 may include a MTA identifier 554, a set of attributes 556, some of which define a fingerprint 558 for the sender MTA, and a sender MTA trust rating 560. The set of attributes 556 may include one or more of list of next hop relays associated with the MTA, associated hostnames for the MTA, sender domain(s) using the MTA. The sender MTA trust rating 560 may categorize the sender MTA as one of unrated, neutral, trusted, suspicious, or malicious. The sender MTA trust rating may be considered an indicator of the level of security risk and/or a trust level associated with the sender MTA. The features considered in determining the trust rating may include one or more of length of time MTA has interacted with the enterprise, number of sender domain sending emails from this MTA, number of recipients in the enterprise the MTA sends emails to, number of emails received from this MTA, number of email replies received from this MTA, number of emails not-opened, number of emails opened, number of emails opened but not replied, number of emails opened but not replied that contain an attachment, number of emails opened but not replied that contains a URL, number of emails replied for this sender, number of emails replied that contain an attachment, number of emails replied that contain a URL, MTA is on CTI blacklist, and whether MTA is marked as suspicious or malicious by CSA.

Figure 6:
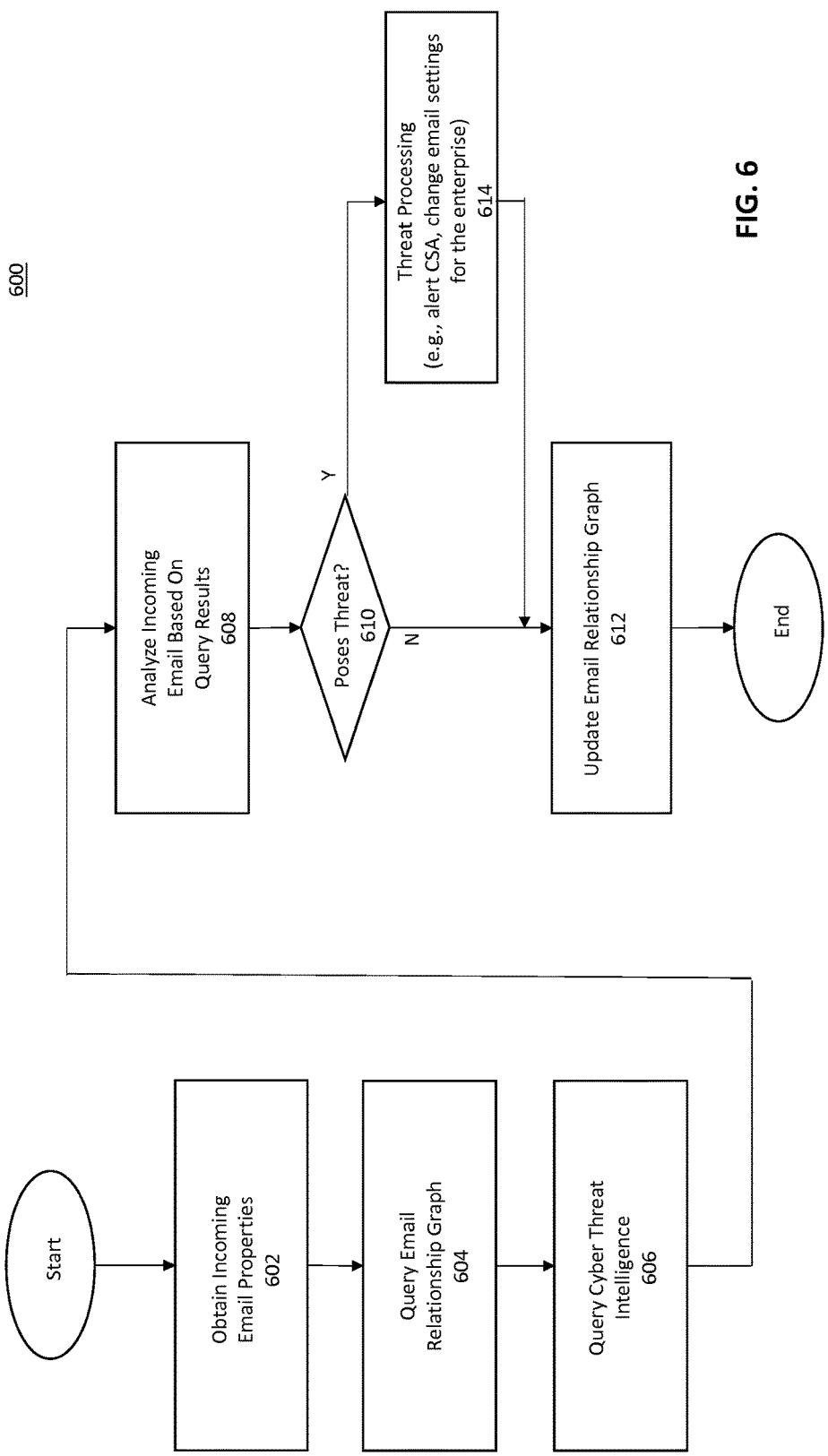
FIG. 6 illustrates a flowchart for a process for detecting and/or handling targeted attacks in the email channel, according to some embodiments.

FIG. 6 illustrates a flowchart for a process 600 for detecting and/or protecting against targeted attacks in the email channel, according to some embodiments. Process 600 may be performed by components in subsystem 106 shown in FIG. 1. In some embodiments, process 600 may not include all operations 602-614, and/or may perform one or more operations 602-614 in an order other than that shown in FIG. 6.

After process 600 is entered, at operation 602, an incoming email or properties regarding the incoming email is obtained. For example, when an incoming email is received at incoming mail system 112, the predictive analyzer 148 obtains either the incoming email or at least a set of properties of the email (e.g., header information, content characteristics, etc.) from the incoming mail system 112. In some embodiments, for example, email security unit 120, when processing the incoming email message, extracts a predetermined set of properties of the incoming email message. An example set of properties may include, but is not limited to, all header fields, attachments and attachment types, message content. At least some of the extracted properties and/or a copy of the email is then provided to the predictive analyzer 148 either by transmitting a message or by causing the predictive analyzer 148 to retrieve the data from a storage of the email security unit 120.

Based upon properties of the incoming email message, at operation 604, predictive analyzer 148 queries email relationship graph 146. The querying of the graph may be via email graph interface 144. The querying may request information from email relationship graph 146 related to the sender, recipient, and/or message corresponding to the incoming email. For example, the querying may include one or more queries based upon the sender, recipient, sender domain, sender MTA, an attachment, an embedded content, selected header fields, or any combination thereof.

At operation 606, predictive analyzer 148 also queries cyber threat intelligence database 132. The querying may request information from CTI database 132 related to the sender, recipient, and/or message aspects corresponding to the incoming email. For example, the querying may include one or more queries based upon the sender, recipient, sender domain, sender MTA, an attachment, an embedded content, selected header fields, or any combination thereof.

At operation 608 results are obtained for the queries performed at operations 604 and 606.

At operation 610, the results obtained from one or both the email relationship graph 146 and the CTI database 132 are analyzed to determine whether the incoming email message poses a threat. This operation may include assigning a score to the incoming email message to indicate the threat level (i.e., level of security risk to the enterprise) referred to herein as the message trust rating. The scoring may include determining one or more of a sender domain score based upon a sender domain fingerprint and a sender domain trust rating, a sender MTA score based upon a sender MTA fingerprint and a sender MTA trust rating, a sender score based upon the sender fingerprint and the sender trust rating, a sender name score determined based upon whether the sender is otherwise identified (e.g., in the enterprise or in the CTI database) as a trusted sender, and a recipient interaction score based upon the recipient interaction profile. After the one or more scores are determined for the various example aspects as above, an aggregated score is determined, and a determination as to the message's trustworthiness is made. For example, the determination of trustworthiness may include categorizing the message as safe, suspicious, highly suspicious or malicious, based upon the determined aggregated score.

If it is determined at operation 610, that the incoming email does not pose a threat (e.g., categorized with a trust rating of safe), then at operation 612, some processing action may be performed that does not consider the incoming email as a threat, and the email relationship graph 146 is updated to reflect that a message, with the parameters of the present message's parameters, was found not to pose a threat. For example, according to an embodiment, an attribute associated with the corresponding edge in the graph 146 is added or updated to reflect the determination as to whether the message is safe.

However, if it is determined at operation 610, that the incoming email does pose a threat (e.g., categorized with a trust rating of suspicious, highly suspicious, or malicious), then at operation 614, processing may be performed to handle (e.g., mitigate or eliminate) the threat. For example, in some embodiments, an alert is transmitted to a CSA providing details (e.g., header information or entire email) regarding the incoming email, and details (e.g., message trust rating, selected header information and/or other information based at least partly on which the decision is made) regarding the information based on which the determination was made. In addition or alternatively, in some embodiments, upon a determination that the email message poses a threat, the incoming MTA, email server and/or the enterprise's email security unit may be instructed to protect against emails with parameters similar to parameters of the present threatening email. In addition or alternatively, in some embodiments, upon a determination that the email message poses a threat, the received message in the email server 122 may be moved to a quarantine folder accessible to the CSA. The quarantine folder may not be accessible to the intended recipient(s) of the message.

Proceeding to operation 612 after operation 614, the email relationship graph 146 is updated to reflect that a message, with the parameters of the present message's parameters, was found to pose a threat. For example, according to an embodiment, an attribute associated with the corresponding edge in the graph 146 is added or updated to reflect the determination as to whether the message is suspicious, highly suspicious or malicious. After operation 612, process 600 has completed processing the incoming email message for purposes of determining whether it poses a threat to the enterprise.

Figure 7:
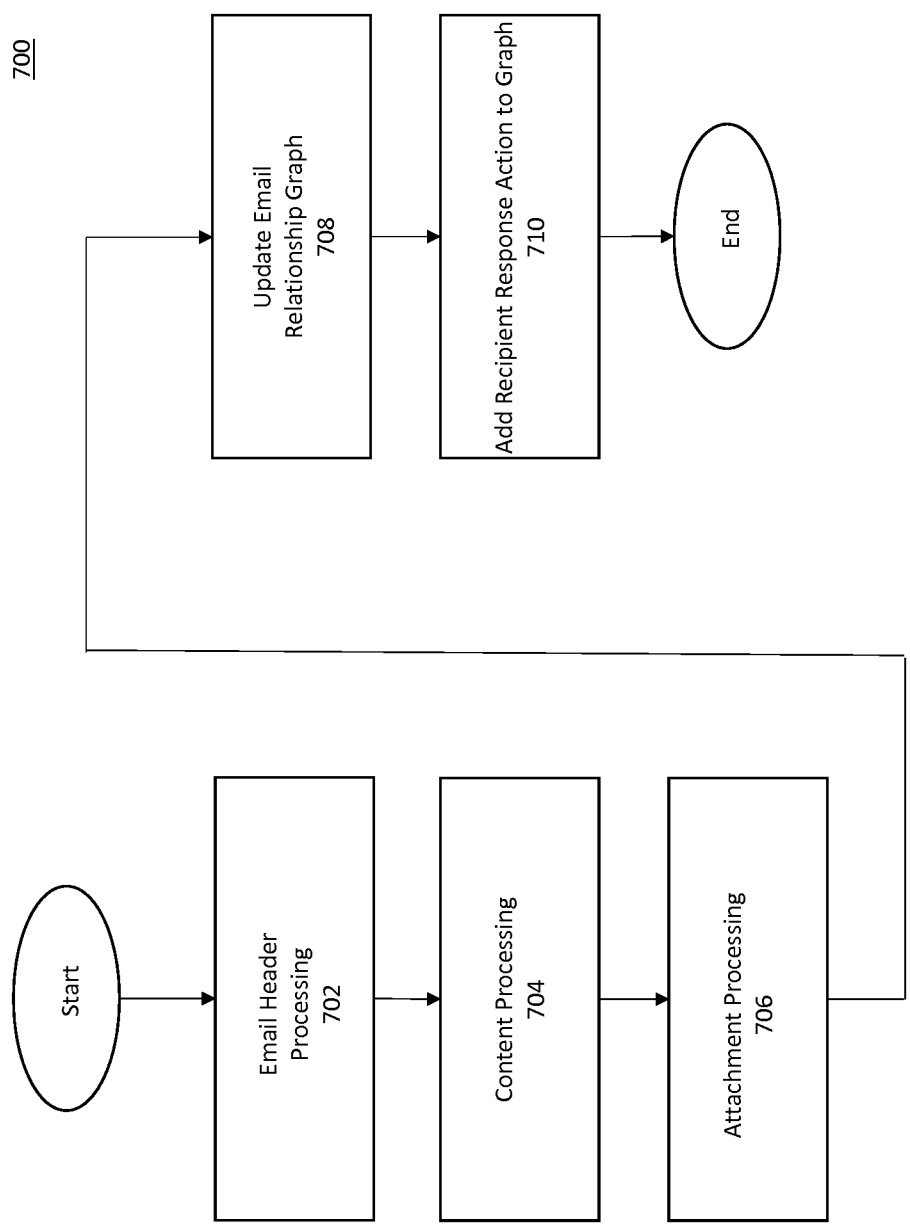
FIG. 7 illustrates a flowchart for a process for analyzing email messages and for updating an email graph, according to some embodiments.

FIG. 7 illustrates a flowchart for a process 700 for analyzing email messages and for updating an email graph, according to some embodiments. Process 700 may be performed by, for example, email crawler 142 when it selects an email from email store 116 to be processed. In some embodiments, email crawler 142 may continuously or periodically execute to process the email store(s) of the enterprise. It will be understood that, in some embodiments, process 700 may be performed with operations 702-710 in the shown order or in another order, and/or may with less or more operations than shown.

After selecting an email message and entering process 700, at operation 702, email header analysis is performed on the selected email message. In this operation, the email header can be parsed into name-value pairs for each of a plurality of attributes. The plurality of attributes may include predetermined attributes and dynamically-determined attributes. The predetermined attributes can be attributes of an email header as defined in the SMTP protocol. Dynamically determined attributes may include attributes determined based upon X-headers from sender MTA or hops in between.

At operation 704, email content meta-analysis is performed in order to identify and extract metadata such as URLs, email addresses, IP addresses, message encoding etc. that are in the email, for example, in the body of the email. In some embodiments, text analysis according to a known technique can be performed to extract the desired metadata.

At operation 706, email attachment meta-analysis is performed in order to identify and/or to validate attachments. In some embodiments, text analysis and/or computation can be performed on any attachments in the select email. For example, hash values may be calculated and/or file type extensions can be validated and/or links, email addresses etc. can be extracted.

At operation 708, the information determined in one or more of the operations 702-706 can be used to update the email relationship graph (e.g., email relationship graph 146). For example, an entry, such as that shown in FIG. 2, for a new email message from a sender to a recipient is added to graph 146. The determined header information can be added as attributes of the sender, recipient, or message.

At operation 710, the action taken by the recipient in response to receiving the message is determined, and this action information is stored in the graph 146 in association with the message. For example, when an email is received by a recipient, the recipient can take following actions in response; open the email, reply to the email, forward the email, move the email to a folder, mark the email as junk, delete the email, or delete without reading the email etc. These actions are stored as an attribute of the edge from the sender to the recipient in the email relationship graph.

It will be appreciated that although in the above description embodiments were described primarily in relation to email, the teachings of this disclosure are also applicable to other electronic communication channels.

It will be appreciated that as used herein, the terms system, subsystem, service, programmed logic circuitry, unit and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor (e.g., central processing unit (CPU) or specialized processor) or a group of processors execute instructions that may be tangibly stored on a computer readable storage medium.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method of processing incoming email messages, comprising:
   receiving aspects of an incoming email message addressed to a first email account holder, the aspects including properties of the incoming email message;
   selecting, from a plurality of predetermined profiles stored in a memory, a recipient interaction profile and/or a sender profile based upon the received properties, wherein the recipient interaction profile includes information associating the first email account holder and a plurality of email senders from whom email messages have previously been received for the first email account holder, and wherein the sender profile includes information associating a sender of the incoming email message with characteristics determined from a plurality of email messages previously received from the sender;
   based upon the incoming email message and the selected recipient interaction profile and/or the sender profile, determining a message trust rating associated with the incoming email message, wherein the determining a message trust rating comprises:
  accessing an email relationship graph in the memory in which the selected recipient interaction profile and the sender profile correspond to a first graph node and a second graph node respectively, and a graph edge from the second graph node to the first graph node is associated with a metadata of one or more previously received email messages from the sender to the first email account holder, the graph edge being further associated with a domain of the sender and a message transfer agent of the sender: and
  calculating the message trust rating based at least upon respective predetermined trust ratings associated with the sender profile, the domain of the sender and the message transfer agent of the sender; and
based upon the determined message trust rating, generating an alert identifying the incoming email message as including a security risk; and
updating the email relationship graph in accordance with the incoming email message, wherein the updating comprises updating a disposition attribute associated with the selected recipient interaction profile or the graph edge with a response of the user to the generated alert.

2. The method according to claim 1, wherein the calculating the message trust rating is further based on whether the sender is identified in an external threat database.

3. The method according to claim 1, wherein the calculating the message trust rating is further based on a recipient interaction score based upon the selected recipient interaction profile.

4. The method according to claim 3, wherein the recipient interaction score is based upon a disposition of one or more previously received messages as indicated in the selected recipient interaction profile or the graph edge.

5. The method according to claim 1, further comprising updating the email relationship graph in accordance with the incoming email message.

6. The method according to claim 5, wherein the updating comprises updating a disposition attribute associated with the selected recipient interaction profile or the graph edge with a response of the user to the generated alert.

7. The method according to claim 1, wherein the accessing the email relationship graph and the calculating is performed by a predictive analyzer without access to the incoming email message and based only on aspects of the incoming email message provided to the predictive analyzer by another process.

8. The method according to claim 1, wherein the domain of the sender and the message transfer agent of the sender are represented as respective special nodes in a memory data structure representation of the email relationship graph, the respective special nodes being associated in said memory with the graph edge and/or the second graph node.

9. The method according to claim 1, further comprising updating, in the memory, at least one of the selected recipient interaction profile, the selected sender profile, or a data structure corresponding to a message from the sender to the first account holder, to record at least a portion of the received aspects and information regarding the determined message trust rating.

10. The method according to claim 1, wherein the graph edge and each of the graph nodes have a respective set of immutable attributes and a respective set of derived attributes, wherein the immutable attributes are determined based upon a corresponding email message, and wherein the derived attributes are determined using (1) calculations using corresponding one or more email messages, and (2) information from a continuously updated external cyber threat intelligence resource, and (3) IP Address to Geo-location mapping information from one or more external databases.

11. A system, comprising:
at least one network interface;
a memory; and
at least one processor configured to perform operations comprising:
  receiving aspects of an incoming email message addressed to a first email account holder, the aspects including properties of the incoming email message;
  selecting, from a plurality of predetermined profiles stored in a memory, a recipient interaction profile and/or a sender profile based upon the received properties, wherein the recipient interaction profile includes information associating the first email account holder and a plurality of email senders from whom email messages have previously been received for the first email account holder, and wherein the sender profile includes information associating a sender of the incoming email message with characteristics determined from a plurality of email messages previously received from the sender;
  based upon the incoming email message and the selected recipient interaction profile and/or the sender profile, determining a message trust rating associated with the incoming email message, wherein the determining a message trust rating comprises:
    accessing an email relationship graph in which the selected recipient interaction profile and the sender profile correspond to a first graph node and a second graph node respectively, and a graph edge from the second graph node to the first graph node is associated with a metadata of one or more previously received email messages from the sender to the first email account holder, the graph edge being further associated with a domain of the sender and a message transfer agent of the sender; and
    calculating the message trust rating based at least upon respective predetermined trust ratings associated with the sender profile, the domain of the sender and the message transfer agent of the sender; and
  based upon the determined message trust rating, generating an alert identifying the incoming email message as including a security risk; and
  updating the email relationship graph in accordance with the incoming email message, wherein the updating comprises updating a disposition attribute associated with the selected recipient interaction profile or the graph edge with a response of the user to the generated alert.

12. A non-transitory computer readable storage medium storing program code which, when executed by a processor of a computing device having a memory and at least one network interface, causes the computing device to perform operations comprising:
receiving aspects of an incoming email message addressed to a first email account holder, the aspects including properties of the incoming email message;
selecting, from a plurality of predetermined profiles stored in a memory, a recipient interaction profile and/or a sender profile based upon the received properties, wherein the recipient interaction profile includes information associating the first email account holder and a plurality of email senders from whom email messages have previously been received for the first email account holder, and wherein the sender profile includes information associating a sender of the incoming email message with characteristics determined from a plurality of email messages previously received from the sender;

based upon the incoming email message and the selected recipient interaction profile and/or the sender profile, determining a message trust rating associated with the incoming email message, wherein the determining a message trust rating comprises:

accessing an email relationship graph in which the selected recipient interaction profile and the sender profile correspond to a first graph node and a second graph node respectively, and a graph edge from the second graph node to the first graph node is associated with a metadata of one or more previously received email messages from the sender to the first email account holder, the graph edge being further associated with a domain of the sender and a message transfer agent of the sender; and calculating the message trust rating based at least upon respective predetermined trust ratings associated with the sender profile, the domain of the sender and the message transfer agent of the sender; and based upon the determined message trust rating, generating an alert identifying the incoming email message as including a security risk; and updating the email relationship graph in accordance with the incoming email message, wherein the updating comprises updating a disposition attribute associated with the selected recipient interaction profile or the graph edge with a response of the user to the generated alert.

\* \* \* \* \*